United States Patent [19]

Stelter et al.

[11] Patent Number: 4,599,918

[45] Date of Patent: Jul. 15, 1986

[54] CONTROL SYSTEM FOR A MOTOR VEHICLE DRIVE UNIT

[75] Inventors: Norbert Stelter, Weissach; Rainer Wuest, Wiernsheim; Peter op de Beeck; Gerd Bofginer, both of Stuttgart, all of Fed. Rep. of Germany

[73] Assignee: Dr. Ing. h.c.F. Porsche Aktiengesellschaft, Fed. Rep. of Germany

[21] Appl. No.: 507,530

[22] Filed: Jun. 24, 1983

[30] Foreign Application Priority Data

Jun. 24, 1982 [DE] Fed. Rep. of Germany ....... 3223555

[51] Int. Cl.$^4$ ............................................. B60K 41/08
[52] U.S. Cl. ......................................... 74/866; 74/864
[58] Field of Search ................. 74/866, 865, 861, 859, 74/863, 864; 364/424.1

[56] References Cited

U.S. PATENT DOCUMENTS

| | | | |
|---|---|---|---|
| 4,107,776 | 8/1978 | Beale | 74/866 X |
| 4,198,882 | 4/1980 | Kiencke et al. | 74/866 |
| 4,269,281 | 5/1981 | Schneider et al. | 74/866 X |
| 4,274,306 | 6/1981 | Yokoi et al. | 74/866 |
| 4,411,174 | 10/1983 | Yokoi et al. | 74/865 X |
| 4,428,257 | 1/1984 | Meyerle et al. | 74/865 X |
| 4,463,427 | 7/1984 | Bonnetain et al. | 74/866 X |

FOREIGN PATENT DOCUMENTS

| | | |
|---|---|---|
| 2811574 | 9/1979 | Fed. Rep. of Germany . |
| 2933714 | 1/1981 | Fed. Rep. of Germany ........ 74/866 |
| 2926106 | 3/1981 | Fed. Rep. of Germany ........ 74/865 |
| 0006235 | 1/1979 | Japan ..................................... 74/866 |
| 0203253 | 11/1983 | Japan ..................................... 74/866 |
| 1556888 | 11/1979 | United Kingdom ................... 74/866 |

Primary Examiner—Kenneth J. Dorner
Assistant Examiner—Stephen B. Andrews
Attorney, Agent, or Firm—Craig & Burns

[57] ABSTRACT

A control system for a motor vehicle drive unit consisting of reciprocating piston engine and of a transmission, in which the drive unit is so controlled that the engine power corresponding to the respective drive pedal position lies always as close as possible but below a stored engine output curve; for that purpose, the engine rotational speed, the drive pedal position, and the engaged transmission speed are determined, whose values are fed to a control apparatus which, in addition to the storage device for the engine power function, also contains stored values for the transmission speeds and which determines and controls the optimum transmission speed in several interrogating and comparison cycles.

10 Claims, 6 Drawing Figures

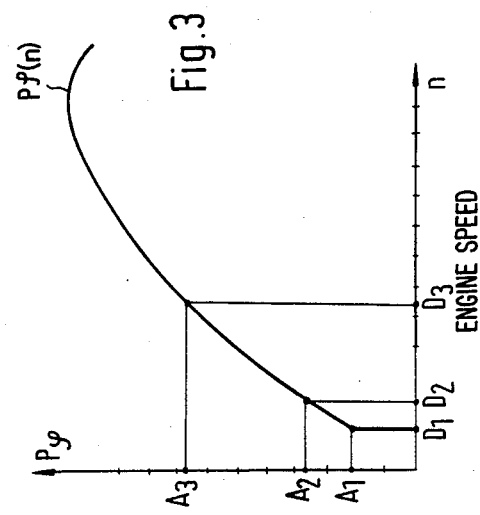
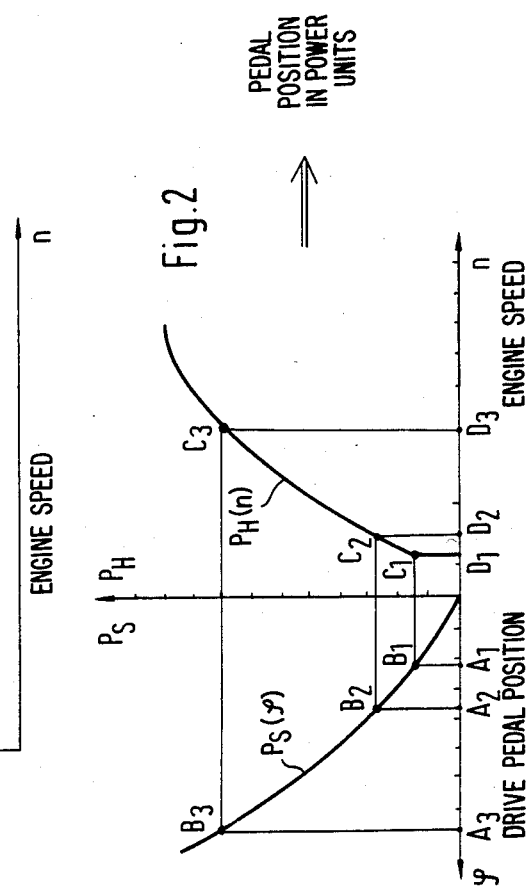

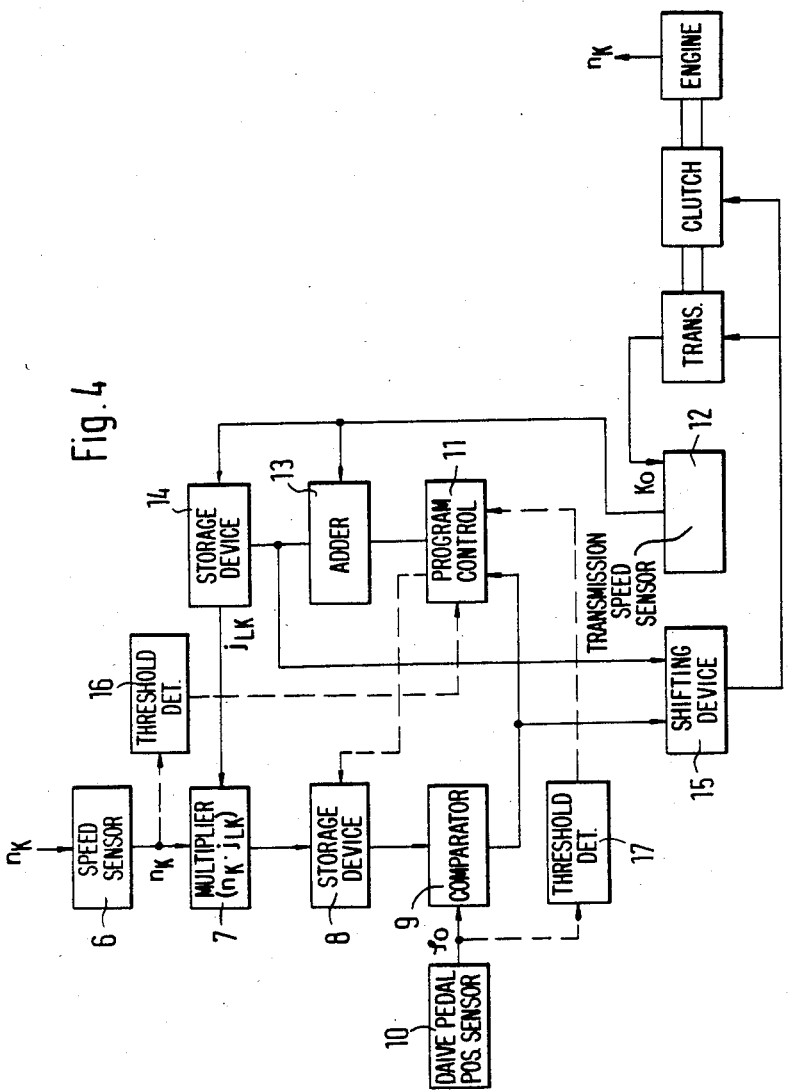

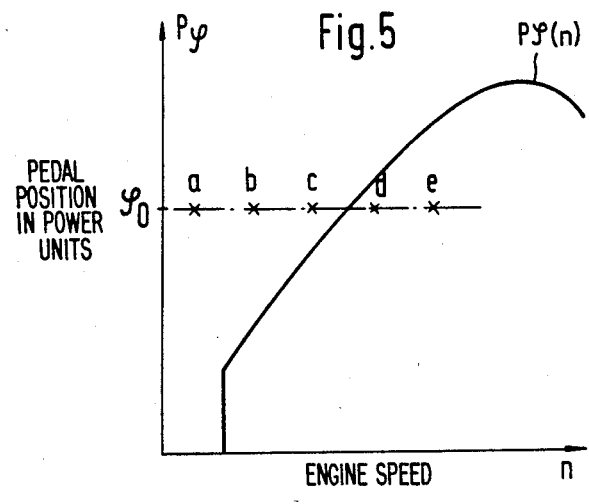
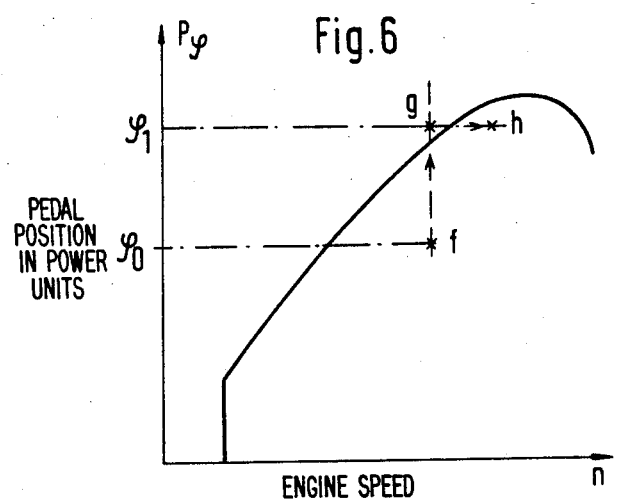

CONTROL SYSTEM FOR A MOTOR VEHICLE DRIVE UNIT

The present invention relates to a control system for a motor vehicle drive unit consisting of an engine and transmission with sensors for the clutch output rotational speed, the speed engaged in the transmission and the position of the drive pedal, which sensors are all connected to a control apparatus.

With the use of such regulating and control systems, the motor vehicle is fully automatically so controlled by actuation of the drive pedal so that the engine operates with a good efficiency under all operating conditions and the fuel consumption is as low as possible. To that end, a gear change mechanism for engaging the most favorable gear ratio or speed of the transmission is controlled by way of the control system to which are fed as inputs, signals of the drive pedal position, of the clutch output rotational speed, of the engine torque as well as of the engine speed.

In a known control system of this type (German Offenlegungsschrift 28 11 574), performance data representing a large number of characteristic curves is stored in the control system, which indicates the engine power as a function of engine rotational speed and throttle valve position. Additionally, transmission performance data is stored in the control system which represents characteristic curves for the transmission ratios as a function of desired engine power level for a given vehicle speed. Disadvantageous with this prior art regulating system is the relatively large storage capacity for the performace data necessary therefor and the complicated questioning or interrogation, in which area, i.e., between which characteristic curves the desired engine operating point lies, whence the overall installation becomes very expensive. A further disadvantage resides in the fact that performance data which are used for the control have been generated for the "new" condition of the motor vehicle type, at accurately defined temperature and air pressure conditions, and thus the actual operating condition of the motor vehicle as well as the ambient conditions are not sufficiently taken into consideration in the control process.

It is therefore the aim of the present invention to provide a control system for a motor vehicle drive unit consisting of an engine and transmission, which can be manufactured with simple means and permits a control on the basis of the actually present characteristic data of the motor vehicle.

The underlying problems are solved according to the present invention in that a control circuit of known construction keeps the engine power constant at a value determined by the position of the drive pedal, and in that characteristic data describing engine power as a function of engine rotational speed is stored in a first storage device and the point of gear change of the transmission corresponding to the respective transmission speeds are stored in a second storage device. The control system effects engagement of the highest possible transmission ratio in the transmission according to measured signals from sensors and the storage values, at which the engine power corresponding to the drive pedal position does not yet exceed the full load (maximum power) curve of engine power. Since only a engine operating curve and only few characteristic values of the transmission ratios are stored in the control apparatus, the storage expenditures are relatively slight. A control circuit for the engine power, known as such, is integrated into the control system of the present invention which, on the basis of the actually existing characteristic values of the motor vehicle, keeps the engine power constant at the value as is predetermined by the position of the drive pedal, for example, by a corresponding adjustment of the throttle valve. A change of the engine rotational speed, respectively, or the engine torque, therefore always takes place along a line of constant power. The control system fully and automatically engages the highest transmission ratio which lies just below a stored full load.

These and other objects, features and advantages of the present invention will become more apparent from the following description when taken in connection with the accompanying drawing which shows, for purposes of illustration only, one embodiment of the present invention, and wherein:

FIG. 1 is a diagram illustrating a full-load curve of maximum engine power, respective engine power curves of given fuel consumptions and an engine power curve of optimum fuel consumption of a reciprocating piston internal combustion engine, plotted against rotational speed;

FIG. 2 is a diagram, illustrating the shifting-up output power $P_H$ for minimum fuel consumption as a function of engine speed and the desired output power $P_S$ as a function of drive pedal position;

FIG. 3 is a diagram for a characteristic drive pedal position curve $P\phi$ of an engine as a function of speed, which is used in the control system of the present invention;

FIG. 4 is a block diagram of the control system in accordance with the present invention;

FIG. 5 is a diagram for the characteristic engine power curve in accordance with the present invention with the rotational speed steps for a five-speed transmission; and FIG. 6 is an engine power curve illustrating a shifting operation with the control system of the present invention.

Referring now to the drawing wherein like reference characters are used throughout the various views to designate like parts, and more particularly to FIG. 1, a full-load line 1 of a reciprocating piston internal combustion engine as well as curves 2, 3, and 4 of respective specific fuel consumptions are illustrated. To operate the engine with the highest possible efficiency, one aims to locate its operating point always in proximity of the curve 2 which represents a minimum fuel consumption. For the operation of a motor vehicle at differing velocities at high efficiency, an optimum operation, i.e., an operation favorable from a fuel consumption point of view can be achieved over the rotational speed along the line 5. However, this goal can be attained only incompletely with a change-speed transmission since the ratio steps of the transmission are far too coarse. Consequently, a different approach is used in the control system of the present invention. One assumes a characteristic engine power curve $P\phi$ which is illustrated in FIG. 3, and engages in each case the transmission ratio, at which the engine power corresponding to the drive pedal position $\phi$ lies as close as possible below the characteristic power curve $P\phi(n)$. Power curve $P\phi(n)$ is formed from the engine power curves illustrated in FIG. 2, from the shifting-up power curve $P_H(n)$ for minimum fuel consumption and from the desired power curved $P_S(\phi)$. For that purpose, the curves $P_H(n)$ and $P_S(\phi)$ are intersected by horizontal lines, i.e., lines of equal power, from which result the points of intersection $B_1$, $B_2$, and $B_3$ along the curve $P_S(\phi)$ and the points $C_1$, $C_2$ and $C_3$ along the curve $P_H(n)$ are obtained. From the projection of the points $B_1$, $B_2$ and $B_3$ on the $\phi$-axis, one obtains the points $A_1$, $A_2$ and $A_3$, while from the projection of the points $C_1$, $C_2$ and $C_3$ on the n-axis, one obtains the points $D_1$, $D_2$ and $D_3$. The values $D_1$, $D_2$ and $D_3$ are now plotted in the diagram of FIG. 3 along the n-axis while the values $A_1$, $A_2$ and $A_3$ are plotted in this diagram along the ordinate.

The line $P_H(n)$ is so selected that with the same engine output power prior and subsequent to a shifting operation, the same specific fuel consumption is achieved. This condition can be fulfilled only if the curve $P_H(n)$ lies above the power curve for optimum efficiency. A corresponding curve $P_R$ after a shifting-down operation then lies below the curve 5 (FIG. 1) so that altogether an engine operation results within the area about the curve 5, i.e., with the best possible efficiency for a change-speed transmission.

Even though in this case $\phi$-values of drive pedal position are plotted, the ordinate is indicated in power units. This is possible because a control circuit for keeping constant the engine power is included in the control system according to the present invention so that a certain power output value is coordinated to each $\phi$-value in a predeterminable manner.

One D-value each and one A-value each of the same number produce together a point of the power curve $P\phi(n)$ which is stored as engine characteristic curve.

The shifting operations are realized fully automatically by means of the control system schematically illustrated in block diagram in FIG. 4 in such a manner that the operating points of the engine lie below the curve $P\phi(n)$ at each power level and each rotational speed. The block diagram relates to a transmission with a double clutch shiftable as a function of load, in which only odd transmission ratio or speed changes are possible, i.e., from 1 to 2 (+1), from 1 to 4 (30 3), from 2 to 3 (+1), from 2 to 5 (+3) and from 2 to 1 (31 1). A rotational speed sensor 6 for the instantaneous clutch output rotational speed $n_K$ is connected with a logic element 7 (designated as a multiplier for descriptive convenience which multiplicatively links the rotational speed $n_K$ with a storage value $j_{lk}$ for changing the transmission ratio and supplying a corresponding output signal by way of a storage device 8 of the engine power curve $P\phi$ to a comparator 9, with which is also connected a drive pedal position sensor and transmitter 10 sensing the instantaneous position $\phi_o$ of the drive pedal. The value $j_{lk}$ is selected from the storage device 14 in dependence on the value $k_0$ representing the transmission speed. If the instantaneous engine power $P_4$ corresponding to $\phi_o$, is smaller than or equal to $P\phi(n)$, then the optimum transmission ratio or speed change is engaged immediately. If, however, the comparison indicates that this condition is not fulfilled, then the output signal of the comparator 9 is fed to an interrogation and program control 11, in which the possible relative transmission ratio or speed changes are determined. The possible transmission ratios or speeds l are formed in a second storage device of an adder 13. Specifically, the ratios or speeds are generated from the relative transmission ratio or speed changes and from the instantaneously engaged speed $k_0$ detected by the speed or transmission ratio sensor 12, whereby l can assume, for example, with a five-speed transmission, only the values 1 to 5. The possible new transmission ratios or speeds l, the changes $j_{lk}$ of the transmission ratios are taken from the storage device 14 for the instantaneous speed or transmission ratio $k_0$, which storage device 14 can be constructed as a self-contained interchangeable structural unit. These signals $j_{lk}$ are fed to the multiplier 7, from which the varied signal again reaches the comparator 9. In order to fulfill the requirement for the engagement of the highest possible transmission ratio or speed, the selection of the possible transmission ratio changes takes place in the program control 11 in the following sequence: shifting-up by three speeds (+3), shifting-up by one speed (+1), retain the engaged speed (0), shifting-down by one speed (−1) and shifting-down by three speeds (−3). This sequence continues for such length of time until, after passing through the routines of elements 13, 14, 7 and 8, the comparison condition is fulfilled in the comparator 9 of P equal to or smaller than $P\phi(n)$. The associated speed is then engaged by means of the shifting device 15 and the next following program cycle begins again with (+3).

The purpose of the control indicated in FIG. 4 by the connecting lines shown as dash lines from the rotational speed sensor 6 by way of a threshold detector 16 to the program control 11 as well as from the drive pedal sensor 10 by way of a threshold detector 17 to the program control 11, is to permit the program control 11 to respond only beginning with a predeterminable rotational speed difference, or only beginning with a predetermined change of the drive pedal position. It is avoided thereby that with vibrating pivot movements of the drive pedal which are caused by vehicle vibrations and shocks, a continuous operation of the control system and a continuing shifting of speeds take place if the engine operating point lies in direct proximity of the line $P\phi(n)$. Consequently, a shifting hysteresis is produced which has to be exceeded at first in order to render the control system operable.

A shifting hysteresis can also be achieved in that a second shifting curve is stored in the storage device 8, which is selected by the program control 11; with a shifting down (−1 or −3) so as to operate the vehicle on different power curves depending on whether a shift-up or shift-down sequence is required. This selection of power curves is indicated by an operative link shown by the dash connection between blocks 11 and 8.

FIG. 5 illustrates the characteristic curve $P\phi(n)$ with the rotational speed steps a, b, c, d, e which correspond to five transmission ratios or speed steps. The curve $P_4(n)$ is cut off in the lower range and coincides with the rotational speed axis.

The following coordination applies, whereby in each case $\phi = \phi_o$.

| | |
|---|---|
| $n_1 \triangleq K_o + 3$ | a |
| $n_1 \triangleq K_o + 1$ | b |
| $n_1 \triangleq K_0, 0$ | c |
| $n_1 \triangleq K_0 - 1$ | d |
| $n_1 \triangleq K_0 - 3$ | e |

As can be recognized, $\phi_o$ lies above the curve $P\phi(n)$ for the speed steps a, b, and c. The control system will interrogate or question the same in sequence and then engage the speed d, with $n_1 = K_0 - 1$ since it is the step lying closest below the curve $P\phi(n)$.

A shifting operation is illustrated in FIG. 6. In this case, the transmission ratio or speed f is momentarily engaged. Since with a constant rotational speed, the corresponding speed or transmission ratio g would lie above the curve $P\phi$ by an increase in pedal position from $\phi_0$ to $\phi_1$, the control system shifts back to the speed h lying below the curve $P\phi$.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A control system for a motor vehicle drive unit including a reciprocating piston engine and a change-speed transmission means with a clutch, comprising first sensing means for sensing the clutch output rotational speed, second sensing means for sensing the position of a drive pedal means for the selective adjustment of the engine output power, a control apparatus, each sensing means being operative with their respective outputs connected to corresponding inputs of the control apparatus, and adjusting means actuated by said control apparatus for selectively engaging the transmission speeds of the change-speed transmission means, said control apparatus including circuit means for keeping the engine output power essentially constant at the value adjusted by the drive pedal means, first storage means for storing characteristic data describing the engine output power as a function of the engine rotational speed, second storage means for storing changing values of the transmission ratio corresponding to the individual transmission speeds, said control apparatus further including means for engaging the highest possible speed in the transmission in accordance with measured values from said sensing means and storage values from said first and second storage means, at which the engine output power corresponding to the drive pedal position does not exceed the engine output power function described by the characteristic curve in said first storage means.

2. A control system according to claim 1, wherein said characteristic data describing the engine output power is formed from a desired characteristic curve of output power as a function of the position of the drive pedal means and from an upper power curve at which, for the same engine power, the same specific fuel consumption is attained after a shifting operation of the transmission means as prior thereto.

3. A control system according to claim 2, including further means in the control apparatus for engaging the highest possible transmission speed, at which the value of the drive pedal position does not yet exceed the value of the characteristic at the rotational speed resulting for this highest possible transmission speed.

4. A control system according to claim 2, wherein the control apparatus includes a third storage means, in which the desired value characteristic data for the desired engine output power as a function of the position of the drive pedal is stored and wherein the control apparatus is operable to engage the highest possible transmission speed, at which the desired engine power does not yet exceed the engine power at the rotational speed resulting for this highest possible transmission speed.

5. A control system according to claim 1, wherein the second storage means is constructed as a self-contained interchangeable structural unit.

6. A control system according to claim 1, wherein the characteristic data of the first storage means coincides in the lower rotational speed range with a fixed value on the rotational speed axis.

7. A control system according to claim 1, wherein the control apparatus engages another speed of the transmission only when at least one of drive pedal angle and rotational speed changes by a predetermined amount with respect to the value used for the control.

8. A control system according to claim 1, wherein the first storage means contains first characteristic data for a shifting-up operation and second characteristic data for a shifting-down operation.

9. A control system according to claim 8, wherein the second characteristic curve is formed from the first characteristic curve by at least one of addition and substraction of a predetermined value.

10. A control system according to claim 1, wherein the further means in the control apparatus for engaging the highest possible transmission speed, at which the value of the drive pedal position does not yet exceed the value of the characteristic data at the rotational speed resulting for this highest possible transmission speed.

* * * * *